US011862369B2

(12) United States Patent
Yahata et al.

(10) Patent No.: US 11,862,369 B2
(45) Date of Patent: Jan. 2, 2024

(54) PERMANENT MAGNETS WITH TAILORED TEXTURE AND MAGNETIC ORIENTATION

(71) Applicant: HRL Laboratories, LLC, Malibu, CA (US)

(72) Inventors: Brennan Yahata, Santa Barbara, CA (US); Eric Clough, Santa Monica, CA (US); Christopher Henry, Thousand Oaks, CA (US); Amber Sucich, Calabasas, CA (US); Darby Laplant, Santa Monica, CA (US); Tobias Schaedler, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 63 days.

(21) Appl. No.: 17/359,556

(22) Filed: Jun. 26, 2021

(65) Prior Publication Data

US 2022/0044851 A1 Feb. 10, 2022

Related U.S. Application Data

(60) Provisional application No. 63/061,798, filed on Aug. 6, 2020, provisional application No. 63/061,800, filed on Aug. 6, 2020.

(51) Int. Cl.
*H01F 1/055* (2006.01)
*C22C 38/00* (2006.01)
(Continued)

(52) U.S. Cl.
CPC .............. *H01F 1/055* (2013.01); *B33Y 80/00* (2014.12); *C22C 38/005* (2013.01); *C22C 38/06* (2013.01);
(Continued)

(58) Field of Classification Search
CPC ........................................................ H01F 1/055
See application file for complete search history.

(56) References Cited

U.S. PATENT DOCUMENTS 8,400,038 B2 3/2013 Smith et al.
9,715,957 B2 7/2017 Wang et al.
(Continued)

FOREIGN PATENT DOCUMENTS

KR  1020150086311 A  7/2015

OTHER PUBLICATIONS

Chang, Baohua, et al. "Influences of laser spot welding on magnetic property of a sintered NdFeB magnet." Metals 6.9 (2016): 202. (Year: 2016).*

(Continued)

*Primary Examiner* — Jophy S. Koshy
(74) *Attorney, Agent, or Firm* — O'Connor & Company; Ryan P. O'Connor

(57) ABSTRACT

Some variations provide a permanent-magnet structure comprising: a region having a plurality of magnetic domains and a region-average magnetic axis, wherein each of the magnetic domains has a domain magnetic axis that is substantially aligned with the region-average magnetic axis, and wherein the plurality of magnetic domains is characterized by an average magnetic domain size. Within the region, there is a plurality of metal-containing grains characterized by an average grain size, and each of the magnetic domains has a domain easy axis that is dictated by a crystallographic texture of the metal-containing grains. The region has a region-average easy axis based on the average value of the domain easy axis within that region. The region-average magnetic axis and the region-average easy axis form a region-average alignment angle that has a standard deviation (Continued)

less than 30° within the plurality of magnetic domains. Many permanent-magnet structures are disclosed herein.

**29 Claims, 9 Drawing Sheets
(1 of 9 Drawing Sheet(s) Filed in Color)**

(51) Int. Cl.
| | |
|---|---|
| *C22C 38/30* | (2006.01) |
| *C22C 38/08* | (2006.01) |
| *C22C 38/10* | (2006.01) |
| *C22C 38/06* | (2006.01) |
| *B33Y 80/00* | (2015.01) |
| *H01F 7/02* | (2006.01) |
| *H01F 1/057* | (2006.01) |
| *H01F 13/00* | (2006.01) |
| *H01F 41/02* | (2006.01) |

(52) U.S. Cl.
CPC ............ *C22C 38/08* (2013.01); *C22C 38/105* (2013.01); *C22C 38/30* (2013.01); *H01F 1/0577* (2013.01); *H01F 7/021* (2013.01); *H01F 7/0278* (2013.01); *H01F 13/003* (2013.01); *H01F 41/0266* (2013.01); *H01F 41/0273* (2013.01); *C22C 2202/02* (2013.01)

(56) References Cited

U.S. PATENT DOCUMENTS

| | | |
|---|---|---|
| 10,269,479 B2 | 4/2019 | Simon et al. |
| 10,692,635 B2 | 6/2020 | Wang et al. |
| 2006/0177702 A1 | 8/2006 | Ajan |
| 2012/0021219 A1 | 1/2012 | Gabay et al. |
| 2016/0133369 A1 | 5/2016 | Loginov et al. |
| 2016/0307678 A1 | 10/2016 | Unosson et al. |
| 2017/0187258 A1 | 6/2017 | Fujikawa et al. |

OTHER PUBLICATIONS

PCT/US2021/039279 International Search Report and Written Opinion, dated Oct. 21, 2021.
PCT/US2021/039280 International Search Report and Written Opinion, dated Oct. 21, 2021.

* cited by examiner

PERMANENT MAGNETS WITH TAILORED TEXTURE AND MAGNETIC ORIENTATION

PRIORITY DATA

This patent application is a non-provisional application claiming priority to U.S. Provisional Patent App. No. 63/061,798, filed on Aug. 6, 2020, and to U.S. Provisional Patent App. No. 63/061,800, filed on Aug. 6, 2020, each of which is hereby incorporated by reference herein.

FIELD OF THE INVENTION

The present invention generally relates to permanent magnets with tailored magnetic properties.

BACKGROUND OF THE INVENTION

A magnet is a material or object that produces a magnetic field. The magnetic field creates a force that acts on other magnets or ferromagnetic materials, such as iron, steel, nickel, or cobalt. A permanent magnet is an object made from a material that is magnetized and creates its own persistent magnetic field.

Although ferromagnetic and ferrimagnetic materials are the only materials attracted to a magnet strongly enough to be commonly considered magnetic, all substances respond at least weakly to a magnetic field. Some ferromagnetic materials are magnetically soft materials ("soft magnets") such as annealed iron. Soft magnets can be magnetized but do not tend to stay magnetized. On the other hand, magnetically hard materials ("hard magnets") tend to stay magnetized and are typically difficult to demagnetize. Permanent magnets are commonly made from hard ferromagnetic materials such as alnico alloys and ferrite that are subjected to special processing in a strong magnetic field during manufacture to align the internal microcrystalline structure, making the materials very hard to demagnetize. Demagnetizing a saturated magnet requires application of a magnetic field whose minimum strength correlates with the magnetic coercivity of the magnet. Hard magnets have high magnetic coercivity, while soft magnets have relatively low magnetic coercivity.

Permanent magnets are commonly made from neodymium, alnico alloys, or ferrites. Neodymium magnets are the strongest and most expensive of the three materials. Strong permanent magnets—especially sintered neodymium (Nd) magnets—have had their magnetic domains oriented in the direction of an easy axis to maximize magnetic strength.

Applications of permanent magnets include, but are not limited to, electric vehicle motors, electric take-off assist motors and sensors, magnetic separators, and magnetic detectors.

State-of-the art bulk permanent magnets are conventionally produced by die-press and sintering methods in which consolidation of powder precursors followed by heat treatment in a magnetic field produces a magnetic and crystallographic alignment in one specific orientation throughout the magnet. Die-press and sintering methods are inherently limited in possible geometries by the shape of the die (prismatic geometry) and eventual loss of net shape due to a shrinkage during sintering. Additionally, the mass loss costs incurred by machining into a final net shape significantly increase the cost of magnets. For example, magnet material cost is about 70% of an electric motor and is a primary limiting factor to wide-scale adoption of electric-motor automotive vehicles powered by permanent-magnet motors. Material cost of rare-earth permanent-magnet materials, required for high-performance automotive and aerospace platforms, is a substantial commercial problem today.

Permanent magnets can be optimized by locally tailoring crystallographic texture in regions susceptible to demagnetization by tailoring the orientation of the easy axis. Conventionally processed high-performing permanent magnets produce a single, or narrow distribution of, easy axis orientations and magnetizations (see FIG. 1). Permanent magnets with this anisotropic crystallographic texture (e.g., die-pressed NdFeB or directionally solidified AlNiCo or FeCoCr) demonstrate desirable magnetic performance, such as magnetic energy density, in comparison to isotropic variants. These anisotropic materials are conventionally produced by die compaction where consolidation of powder precursors produces a uniform texture, a result of directionally imposed plastic deformation, throughout the material. The nearly uniform orientation of the crystal structure aligns the easy axis of each grain, thereby allowing the material to be magnetized in a single orientation with a narrow distribution, producing larger achievable magnetizations. However, in many applications such as electric motors, generated magnetic fields interact non-uniformly with these magnetic materials. Because fields generated in these applications are non-uniformly concentrated in regions of high and low magnetic flux density to maximize motor efficiencies, regions such as corners and surfaces of the permanent magnet material are more susceptible to demagnetization than the interior bulk. The magnetic field angle of incidence in these regions can vary significantly away from the angles producing maximal torque and lead to demagnetization under weaker applied fields—thus limiting the achievable weight and volume efficiencies of the magnetic material. State-of-the-art manufacturing die-press and sinter methods are significantly constrained to uniaxial textures and, as mentioned above, prismatic geometries. Many desirable textures and magnetic shapes are not possible using the known art.

It would be desirable to impose different magnetic orientations at specific locations within a magnet, to augment the capability of tailoring a magnetic field. For instance, field strength could be increased on one side of a magnet while cancelling the field to near zero on the other side of the magnet, using arrays of magnetic orientations in different directions. These types of designs are typically assembled by bonding magnets together, in a structure known as a Halbach array. More generally, location-specific magnetic orientations would be beneficial because the shape and intensity of the magnetic field generated by a permanent magnet could be designed into the magnet architecture without physically changing the shape of the magnet.

Magnetic anisotropy describes how an object's magnetic properties can be different depending on direction. When there is no preferential direction for an object's magnetic moment, the object will respond to an applied magnetic field in the same way, regardless of which direction the field is applied. This is known as magnetic isotropy. In contrast, magnetically anisotropic materials will be easier or harder to magnetize depending on which way the object is rotated. For many magnetically anisotropic materials, there are at least two easiest directions to magnetize the material, which are a 180° rotation apart. The line parallel to these directions is called the magnetic easy axis and is an energetically favorable direction of spontaneous magnetization.

Magnetocrystalline anisotropy has a great influence on industrial uses of ferromagnetic materials. Materials with high magnetic anisotropy usually have high magnetic coercivity—that is, they are hard to demagnetize. These are called hard ferromagnetic materials and are used to make permanent magnets. For example, the high anisotropy of rare-earth metals is mainly responsible for the strength of rare-earth magnets. During manufacture of magnets, a powerful magnetic field aligns the microcrystalline grains of the metal such that their easy axes of magnetization all point in the same direction, freezing a strong magnetic field into the material.

Nearly uniform orientation of a crystal structure aligns the easy axis of each grain, allowing the material to be easily magnetized with a small orientation distribution and giving the material a high resistance to uniform demagnetizing fields. Resistance to demagnetization has been increased in the art by manipulating process-dependent microstructure and chemistry to optimize competing mechanisms in generating high-energy products. However, in applications such as electric motors, generated magnetic fields interact non-uniformly with magnetic materials. Because fields generated are non-uniformly concentrated to regions of high and low magnetic flux density, regions such as corners and surfaces of the magnet are highly susceptible to demagnetization. In addition, the corners are inherently susceptible to demagnetization even in with uniform flux, due to the magnet geometry and microstructure. The magnetic field angle of incidence in these regions can vary significantly away from the angles producing maximal torque and lead to demagnetization, thereby limiting the achievable weight and volume efficiencies of the magnetic material.

State-of-the-art bulk permanent magnet materials (e.g. NdFeB) with anisotropic crystallographic texture have desirable magnetic performance in comparison to isotropic variants. Anisotropic materials are conventionally produced by die-press and sintering methods in which consolidation of powder precursors produces a relatively uniform texture throughout the material. Heat treatment in a magnetic field then produces relatively uniform magnetic alignment of all grains in the material. The die-press and sinter methods are significantly constrained to prismatic geometries and uni-axial textures, and therefore limited in their ability to achieve desirable crystallographic textures and magnetic shapes.

The benefits of easy axis alignment through texturing in permanent magnets are well-known. See Dulis et al., "Solid NdFeB Magnets Made by Gas Atomization and Extrusion", *Science and Technology of Nanostructured Magnetic Materials,* 1991, pages 599-606; and White et al., "Net shape processing of alnico magnets by additive manufacturing", *IEEE Transactions on* Magnetics, 53.11 (2017): 1-6. Some methods of texture control in NdFeB are based on plastic deformation of a consolidated material. In this technique, the crystallographic orientation is largely uniform in the extrusion direction (e.g. c-axis for NdFeB permanent magnets) with limited ability to control the texture in orientations other than the direction of plastic deformation. Directional solidification is alternatively used to produce uniaxial texture, but texture in these methods is uniaxial and dependent on the maximum thermal gradient. Directional solidification is severely limited in two ways. First, texture in the preferred growth direction, in the case of NdFeB, produces a preferred growth orientation [100] orthogonal to the easy axis direction which is the [001] c-axis in NdFeB. Second, these methods produce long columnar grains well above the single-domain limit for these materials, thus limiting the achievable coercivity. See Ma et al., "The impact of the directional solidification on the magnetic properties of NdFeB magnets", *Journal of applied physics* 70.10 (1991): 6471-6473.

Current methods to additively manufacture permanent magnets are limited to those easily processible by liquid-processing methods and very limited in achievable performance for higher-energy-product NdFeB materials where microstructures are heavily optimized for die-press methods. See Kolb et al., "Laser Beam Melting of NdFeB for the production of rare-earth magnets", 2016 *6th International Electric Drives Production Conference* (EDPC), IEEE, 2016 and Jacimovic et al., "Net shape 3D printed NdFeB permanent magnet", preprint arXiv:1611.05332 [physics.ins-det] (2016).

Control of crystallographic texture in directed energy deposition (DED) manufacturing using external magnetic fields to alter crystal texture in structural alloys has been described in academic studies. See Wang et al., "Texture control of Inconel 718 superalloy in laser additive manufacturing by an external magnetic field", *Journal of materials science* 54.13 (2019): 9809-9823; and Wang et al., "Effect of External Magnetic Field on the Microstructure of 316L Stainless Steel Fabricated by Directed Energy Deposition", Proceedings of the ASME 2019 International Mechanical Engineering Congress and Exposition, Volume 2B: Advanced Manufacturing (2019). While DED using powder spray or wires produces parts with less geometric constraints than traditional methods, these parts usually need extensive finishing procedures due to a poor surface finish after deposition has occurred. This is in contrast to powder bed-based processes which can produce near-net-shape parts after deposition.

The current methods are inherently limited to microstructures conventionally achieved in the unique thermoprocessing conditions of additive manufacturing (columnar grains >100 μm), which limits the magnetic performance of additively manufactured materials. In addition, current additive-manufacturing methods to produce hard magnetic materials are limited to materials with low-energy products (<50 kJ/m$^3$). State-of-art NdFeB magnet materials can have energy products >400 kJ/m$^3$, but only when employing conventional processing methods that lack texture control.

There is a desire to control solidification of additively manufactured or welded microstructures on length scales lower than provided by the prior art, to maximize the resistance to demagnetization in addition to controlling the orientation of the magnetic easy axis. It is sought to bridge extensive gap in performance between additive manufacturing and conventional processing methods. New or improved methods, structures, and systems are desired for tailoring magnetism in permanent magnets.

SUMMARY OF THE INVENTION

The present invention addresses the aforementioned needs in the art, as will now be summarized and then further described in detail below.

Some variations provide a permanent-magnet structure comprising:
  a region having a plurality of magnetic domains and a region-average magnetic axis, wherein each of the magnetic domains has a domain magnetic axis, wherein each domain magnetic axis is substantially aligned with the region-average magnetic axis, and wherein the plurality of magnetic domains is characterized by an average magnetic domain size; and within the region, a plurality of metal-containing grains, wherein the plurality of metal-containing grains is characterized by an average grain size, wherein each of the magnetic domains has a domain easy axis that is dictated by a crystallographic texture of the metal-containing grains;

wherein the region has a region-average easy axis based on average value of the domain easy axis within the region; and wherein the region-average magnetic axis and the region-average easy axis form a region-average alignment angle θ that preferably has a θ standard deviation of less than 30° based on alignment-angle variance within the plurality of magnetic domains.

There may be one region or many regions. When there are multiple regions, the individual region-average magnetic axes and the individual region-average easy axes may vary spatially, such as different orientations in different corners of the structure. Regions may be bulk regions contained in the interior of the permanent-magnet structure and/or surface regions contained at the surface of the permanent-magnet structure.

The magnetic domain averages and easy axis averages may vary spatially—e.g., different orientations in different corners—in different areas of the permanent-magnet structure. The variations across regions may be regular or irregular.

The metal-containing grains may contain a metal selected from the group consisting of Fe, Ni, Al, Co, Cr, Nd, B, Sm, Dy, and combinations thereof. In some embodiments, the metal-containing grains contain a metal alloy selected from the group consisting of NdFeB, FeCoCr, FeAlNiCo, SmCo, $Dy_2O_3$, $SrRuO_3$, and combinations thereof. When there are multiple regions, there may be different compositions in those regions, including different types or amounts of metal-containing grains, for example. An example is a surface region with a different composition than a bulk region of the permanent-magnet structure.

In some embodiments, the region-average alignment angle θ is from −10° to 10°, from −5° to 5°, from −2° to 2°, or from −1° to 1°. In other embodiments, the region-average alignment angle θ is selected from 0° to 90°. In certain embodiments, the region-average alignment angle θ is 0°. In certain embodiments, the region-average alignment angle θ is 90°. The region-average alignment angle θ standard deviation may be less than 20°, less than 10°, or less than 5°, for example.

In some embodiments, the region-average easy axis has a standard deviation that is less than 25°, less than 20°, less than 10°, or less than 5°. This standard deviation is calculated based on all of the domain easy axes within a given region. In certain embodiments, each domain easy axis is substantially aligned with the region-average easy axis, in which case the standard deviation may be less than 2°, less than 1°, less than 0.5°, less than 0.1°, or about 0°.

A magnetic domain may contain an individual metal-containing grain. Typically, a magnetic domain contains multiple metal-containing grains. In some embodiments, the average magnetic domain size is about the same as the average grain size. In other embodiments, the average magnetic domain size is larger than the average grain size.

The average magnetic domain size may be from 1 micron to 1000 microns, for example. In some embodiments, the average magnetic domain size is from 10 microns to 10 millimeters.

The average grain size may be from 0.1 microns to 50 microns, for example. An exemplary average grain size is from about 1 micron to about 5 microns.

In some embodiments, the metal-containing grains are substantially equiaxed grains. In other embodiments, the metal-containing grains are substantially columnar grains. In certain embodiments, the metal-containing grains are a combination of substantially equiaxed grains and substantially columnar grains.

In the permanent-magnet structure, the region may have a characteristic length scale selected from 100 microns to 1 meter, for example.

In some permanent-magnet structures, there is at least one additional region having a plurality of additional magnetic domains and a plurality of metal-containing grains. The additional region may have a different composition compared to the bulk region(s).

In some embodiments, the additional region is contained at a corner or edge of the permanent-magnet structure. In these or other embodiments, the additional region is contained at a surface of the permanent-magnet structure.

In some embodiments, the permanent-magnet structure is contained within a Halbach array.

In some embodiments, the permanent-magnet structure is an additively manufactured structure.

In some embodiments, the permanent-magnet structure is a welded structure.

The permanent-magnet structure may be contained within a solid bulk magnet. Alternatively, the permanent-magnet structure may be contained within a porous magnet.

BRIEF DESCRIPTION OF THE FIGURES

The patent or application file contains at least one drawing executed in color. Copies of this patent or patent application publication with color drawings will be provided by the Office upon request and payment of the necessary fee.

DETAILED DESCRIPTION OF EMBODIMENTS OF THE INVENTION

Figure 1:
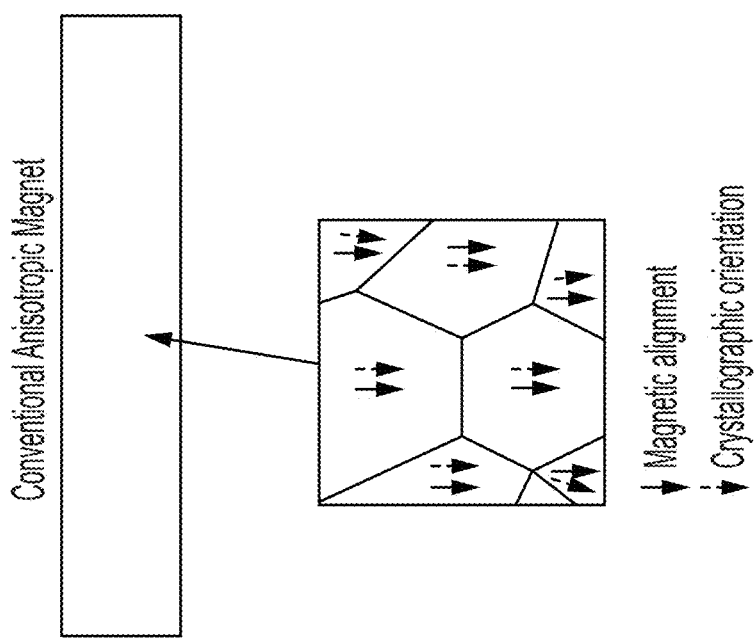
FIG. 1 depicts a conventional isotropic magnet (left side) and a conventional anisotropic magnet (right side).
Figure 1:
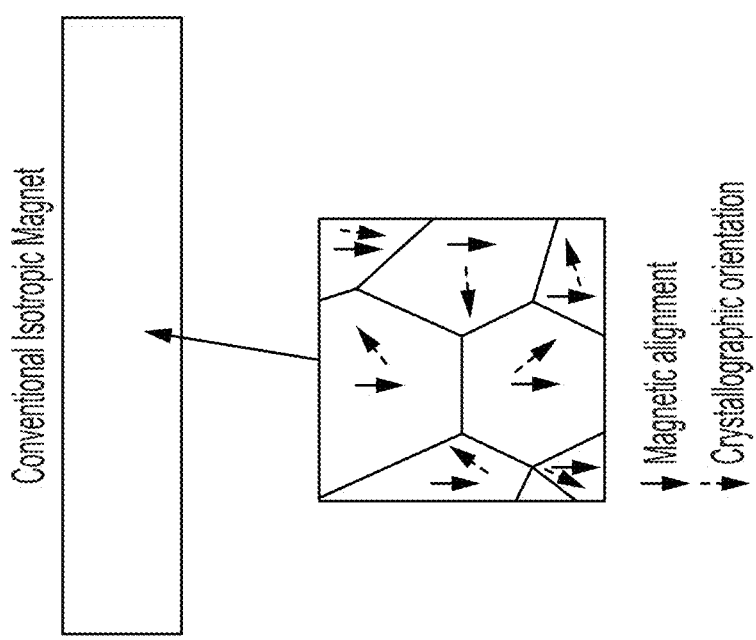

The magnets, structures, compositions, methods, and systems of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present invention provides a permanent magnet with location-specific magnetic orientation and crystallographic texture. This disclosure describes the structure of permanent magnets with tailored texture as well as methods of controlling solidification to achieve a tailored texture.

The methods disclosed herein provide an efficient way to shape the magnetic field induced by a permanent magnet. In some variations, additive manufacturing (e.g., selective laser melting or electron beam melting) is employed to fabricate a permanent magnet voxel by voxel and layer by layer, so that the magnetic orientation of each voxel may be independently aligned via applying a magnetic field during the solidification of each voxel. A "voxel" is a volumetric (3D) pixel. In additive manufacturing, there is solidification of individual voxels so that the magnetic field may be varied voxel-by-voxel if desired. A plurality of voxels forms a single layer having a thickness defined by the voxel height.

Additive manufacturing also enables site-specific control of the crystallographic orientation during three-dimensional (3D) printing. The solidification texture depends on crystal structure, lattice strain, and surface attachment kinetics, and is directionally dictated by a maximal thermal gradient during the phase transformation from liquid to solid. Thermal gradients may be controlled during selective laser melting using (a) a laser scan strategy, e.g. locally heating in a predetermined raster pattern and energy intensity and/or (b) an externally applied magnetic field to influence texture evolution. In some embodiments, the magnetic easy axis orientation aligns with a crystallographic orientation in which resistance to demagnetization is maximized. Using the principles of this disclosure, the magnetic performance of a permanent magnet may be improved by controlling crystallographic orientation (texture) of the grains in the microstructure of the permanent magnet. This invention is especially powerful when crystallographic texture control and magnetic orientation are combined during additive manufacturing. The result is a magnet which contains regions with different crystallographic and magnetic orientations, which may be optimized in various ways.

Some variations are predicated on favorable orientations of the magnetic easy axis within a magnet architecture. Preferred embodiments enable the control of solidification of additively manufactured or welded microstructures on the order of the single domain limit (e.g., about 1-3 microns) to maximize the resistance to demagnetization in addition to controlling the orientation of the magnetic easy axis.

In some embodiments, easy axis alignment is designed into regions of interest, such as surfaces or corners, to improve overall resistance to demagnetization in a bulk magnet. This approach enables fabrication of magnets with a strong field on one side, while the field on the other side is close to zero, for example. Such region optimization is on a length scale (e.g., less than 500 microns) that is infeasible with conventional manufacturing methods which require serial assembly.

The present invention increases permanent-magnet performance while potentially reducing manufacturing costs compared to current manufacturing methods described in the Background. Material costs of rare-earth permanent-magnet materials, required for high-performance automotive and aerospace platforms, are significantly reduced by using powder-bed or spray-based additive manufacturing methods. The reason is that a near-net-shape product can be produced with minimal material waste upon finishing and with a high rate of material recycling.

By improving the demagnetization resistance of magnetic architectures through tailored crystallographic textures, the mass and volume efficiency of magnets can be improved. This, in turn, reduces the necessary material mass for matching performance to improve motor efficiencies. In addition, the invention provides the capability to produce optimized magnet shapes which optimize field utility. The ability to use higher magnetic fields enables efficiency gains in permanent-magnet motors. All of these factors improve permanent-magnet motor efficiencies and decrease the overall cost to manufacture.

Some variations provide a permanent-magnet structure comprising:

a region having a plurality of magnetic domains and a region-average magnetic axis, wherein each of the magnetic domains has a domain magnetic axis, wherein each domain magnetic axis is substantially aligned with the region-average magnetic axis, and wherein the plurality of magnetic domains is characterized by an average magnetic domain size; and within the region, a plurality of metal-containing grains, wherein the plurality of metal-containing grains is characterized by an average grain size, wherein each of the magnetic domains has a domain easy axis that is dictated by a crystallographic texture of the metal-containing grains;

wherein the region has a region-average easy axis based on average value of the domain easy axis within the region; and wherein the region-average magnetic axis and the region-average easy axis form a region-average alignment angle θ that has a θ standard deviation of less than 30° based on alignment-angle variance within the plurality of magnetic domains.

A "permanent magnet" (or "hard magnet") means a magnet with an intrinsic magnetic coercivity of 1000 A/m (amperes per meter) or greater. For example, a permanent magnet may be selected from the group consisting of a NdFeB magnet, a NdDyFeB magnet, a FeCoCr magnet, a FeAlNiCo magnet, a SmCo magnet, and combination thereof.

The "magnetic axis" is the straight line joining two poles of a magnetized body. The torque exerted on the magnet by a magnetic field in the direction of the magnetic axis equals 0. The "crystallographic texture" is the distribution of crystallographic orientations of a polycrystalline material. A "crystallographic orientation" is defined by the plane (Miller) indices of the lattice plane of a crystal.

There may be one region or many regions. When there are multiple regions, the individual region-average magnetic axes and the individual region-average easy axes may vary spatially, such as different orientations in different corners of the structure. Regions may be bulk regions contained in the interior of the permanent-magnet structure and/or surface regions contained at the surface of the permanent-magnet structure.

The magnetic domain averages and easy axis averages may vary spatially—e.g., different orientations in different corners—in different areas of the permanent-magnet structure. The variations across regions may be regular or irregular.

Each metal-containing grain has a grain easy axis. If a magnetic domain is the same as a grain, as in some embodiments, then the grain easy axis is the same as the domain easy axis. But if a magnetic domain is larger than one grain (e.g., 5 grains), then the domain easy axis is dictated by easy axes of all individual grains in the magnetic domain.

The metal-containing grains may contain a metal selected from the group consisting of Fe, Ni, Al, Co, Cr, Nd, B, Sm, Dy, and combinations thereof. In some embodiments, the metal-containing grains contain a metal alloy selected from the group consisting of NdFeB, FeCoCr, AlNiCo, SmCo, $Dy_2O_3$, $SrRuO_3$, and combinations thereof. When there are multiple regions, there may be different compositions in those regions, including different types or amounts of metal-containing grains, for example. An example is a surface region with a different composition than a bulk region of the permanent-magnet structure.

The selection of components in the overall composition will be dependent on the desired magnet properties and should be considered on a case-by-case basis. Someone skilled in the art of material science or metallurgy will be able to select the appropriate materials for the intended use, based on the information provided in this disclosure.

In some embodiments, the region-average alignment angle θ is from −10° to 10°, from −5° to 5°, from −2° to 2°, or from −1° to 1°. In other embodiments, the region-average alignment angle θ is selected from 0° to 90°. In certain embodiments, the region-average alignment angle θ is 0°. In certain embodiments, the region-average alignment angle θ is 90°. The region-average alignment angle θ standard deviation may be less than 20°, less than 10°, or less than 5°, for example.

In some embodiments, the region-average easy axis has a standard deviation that is less than 25°, less than 20°, less than 10°, or less than 5°. This standard deviation is calculated based on all of the domain easy axes within a given region. In certain embodiments, each domain easy axis is substantially aligned with the region-average easy axis, in which case the standard deviation may be less than 2°, less than 1°, less than 0.5°, less than 0.1°, or about 0°.

A magnetic domain may contain an individual metal-containing grain. Typically, a magnetic domain contains multiple metal-containing grains. In some embodiments, the average magnetic domain size is about the same as the average grain size. In other embodiments, the average magnetic domain size is larger than the average grain size.

The average magnetic domain size may be from 1 micron to 1000 microns, for example. In some embodiments, the average magnetic domain size is from 10 microns to 10 millimeters.

The average grain size may be from 0.1 microns to 50 microns, for example. An exemplary average grain size is from about 1 micron to about 5 microns.

Grain sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

In some embodiments, the metal-containing grains are substantially equiaxed grains. In other embodiments, the metal-containing grains are substantially columnar grains or elongated grains. In certain embodiments, the metal-containing grains are a combination of substantially equiaxed grains and substantially columnar grains. Grains may be surrounded by a grain boundary layer with a different composition and magnetic properties.

In the permanent-magnet structure, the region may have a characteristic length scale selected from 100 microns to 1 meter, such as about 1 mm, 1 cm, or 10 cm, for example.

In some permanent-magnet structures, there is at least one additional region having a plurality of additional magnetic domains and a plurality of metal-containing grains. The additional region may have a different composition compared to the bulk region(s).

In some embodiments, the additional region is contained at a corner or edge of the permanent-magnet structure. In these or other embodiments, the additional region is contained at a surface of the permanent-magnet structure. For example, a corner or edge of a cuboid permanent magnet may have crystallographic and magnetic orientation facing out of the corner whereas the rest of the magnet has crystallographic and magnetic orientation facing towards a bulk region internally.

In some embodiments, the permanent-magnet structure is contained within a Halbach array. Halbach arrays are conventionally assembled by bonding individually uniform texture and magnetic orientation magnets in a sequence of orientations that accentuates the field on one side of the magnet at the expense of the field on the opposing side. This conformation sacrifices field uniformity due to the large size (>1 mm) of the magnets used conventional Halbach arrays. By using the principles disclosed herein, a Halbach array configuration may be constructed at the micron scale, thereby enabling more-uniform, high-flux magnetic fields to be generated in the permanent magnet.

In some embodiments, the permanent-magnet structure is an additively manufactured structure. Additive manufacturing is discussed in more detail below. In some embodiments, the permanent-magnet structure is a welded structure.

The permanent-magnet structure may be contained within a solid bulk magnet. Alternatively, the permanent-magnet structure may be contained within a porous magnet. The porosity may vary, such as from 0% to about 50%, or from 0% to about 20%, by volume. Additionally there may be some topology including irregular surfaces, discontinuous interfaces, internal roughness, etc.

The present invention will now be further described, including with reference to the accompanying drawings that are not intended to limit the scope of the invention. The drawings are not necessarily to scale.

FIG. 1 depicts a conventional isotropic magnet (left side) and a conventional anisotropic magnet (right side). In a conventional die-pressed isotropic magnet, crystallographic orientation of grains is non-uniform and random, and magnetic alignment is along the same direction throughout the volume of the magnet. In a conventional die-pressed anisotropic magnet, magnetic alignment is along the same direction throughout the volume of the magnet, and there is some alignment and uniformity of crystallographic orientation of grains. The anisotropic variant generates a higher-energy product due to the alignment along the easy axis.

Figure 2:
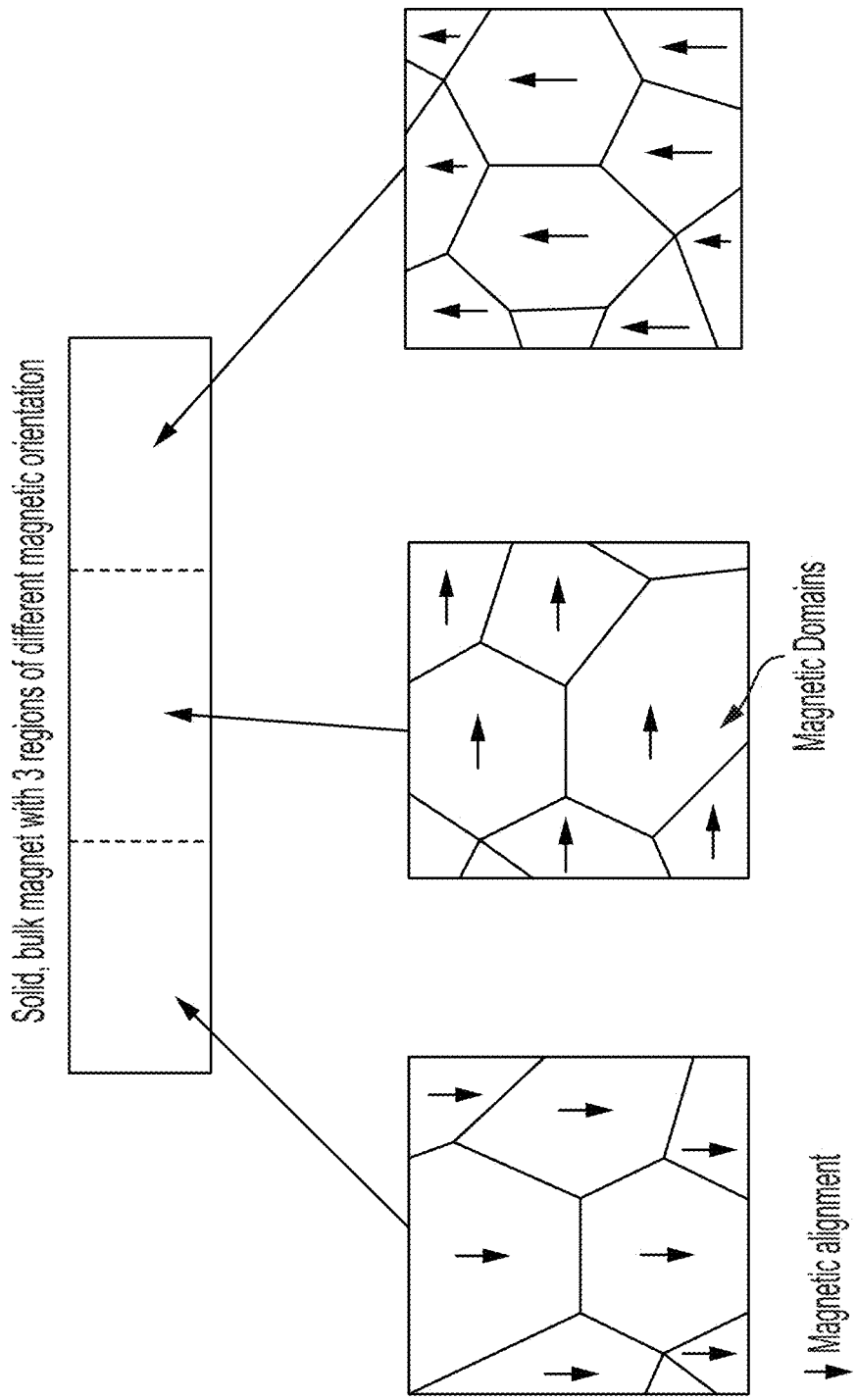
FIG. 2 depicts a magnet with a magnetic field applied in three different directions within three regions.

In contrast, FIG. 2 depicts a solid, bulk magnet with a magnetic field applied in three different directions within the three regions shown. The crystallographic orientation has not been controlled and is therefore not shown. In the permanent-magnet structure of FIG. 2, there is location-specified magnetization orientation (but not location-specified crystallographic texture), in reference to the easy axis orientation, throughout the total volume. The magnetic orientation changes by 90° across each region from left to right in FIG. 2. Because the crystallographic orientation has not been controlled, it is statistically unlikely to be aligned with the magnetic orientation. That is, in FIG. 2, a region-average magnetic axis and a region-average easy axis form a region-average alignment angle θ that may have a high θ standard deviation (such as 30° or higher) based on alignment-angle variance within the plurality of magnetic domains.

Figure 3:
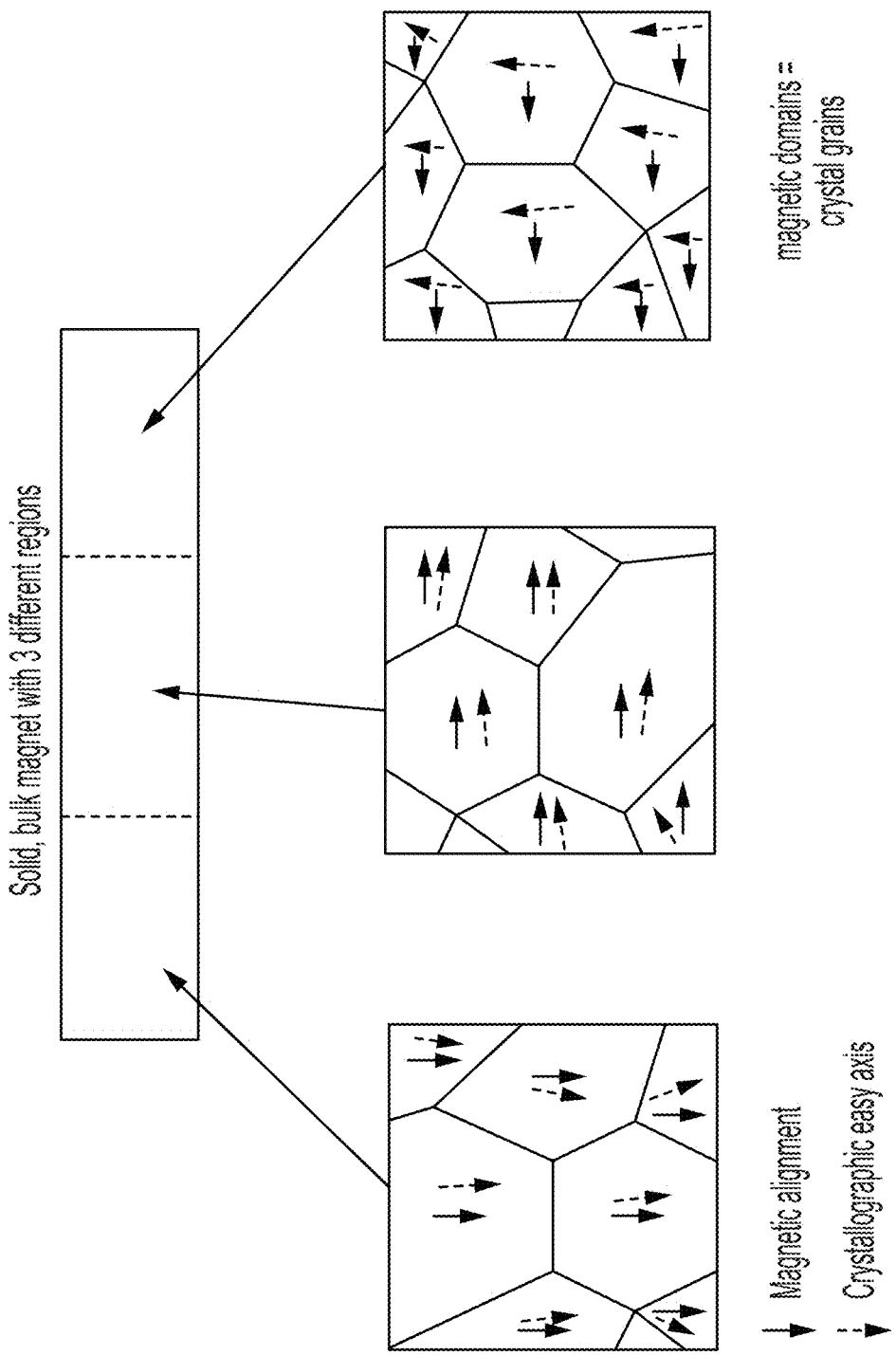
FIG. 3 depicts a magnet with a magnetic field in three different directions in three regions, with the crystallographic orientation controlled through thermal gradients in solidification.

FIG. 3 depicts a solid, bulk magnet with magnetic field in three different directions in the three regions shown. Additionally, the crystallographic orientation has been controlled through thermal gradients in solidification (e.g., from additive manufacturing or welding). In the permanent-magnet structure of FIG. 3, there is location-specified magnetization orientation and crystallographic texture, in reference to the easy axis orientation, throughout the total volume. The magnetic orientation changes by 90° from the first (left) regions to the second (middle) region, and then changes by 180° from the second to the third (right) region in FIG. 3. The crystallographic easy axis changes by approximately 90° across each regions from left to right in FIG. 3. In the first two regions, the easy axis is closely aligned with the magnetic orientation, resulting in increased energy product.

In each of FIG. 2 and FIG. 3, the height of the bulk magnet may be on the order of 1 cm, while the individual grain size may be on the order of 1 to 5 microns, for example. Thus the squares depicting multiple grains and orientations represent a small portion of the volume of each region.

The difference between the structures in FIGS. 2 and 3 is that in FIG. 2, magnetic orientation is controlled but the crystallographic orientation is not controlled, while in FIG. 3, both of the magnetic orientation and the crystallographic orientation are controlled. In either case, the magnetization orientation may be designed with specific orientations in different regions (or voxels) of the permanent-magnet structure. Magnetic domains may be larger than crystal grains. In certain preferred embodiments, each individual grain is individually tailorable, as noted in FIG. 3 (magnetic domains=crystal grains).

Control of both crystallographic texture and magnetization direction in permanent magnets may utilize combinations of magnetization direction and easy axis alignment (grain orientations). This control may augment magnetic field distribution and tailor the field shape generated by the permanent magnet. The voxel size of the controlled region may be 10 μm×10 μm×10 μm in size, for example, dependent on the additive-manufacturing, welding, or other method to control the local microstructure. In certain embodiments, single magnetic domains with uniform magnetic orientation exist in single grains which can be individually oriented crystallographically.

Interfaces between domains are susceptible to domain reversal (demagnetization) due to a lower barrier to nucleation. By matching a single magnetic domain with a single grain, the resistance to domain reversal within that grain is minimized, raising the energy barrier to nucleation of a reverse domain.

Figure 4:
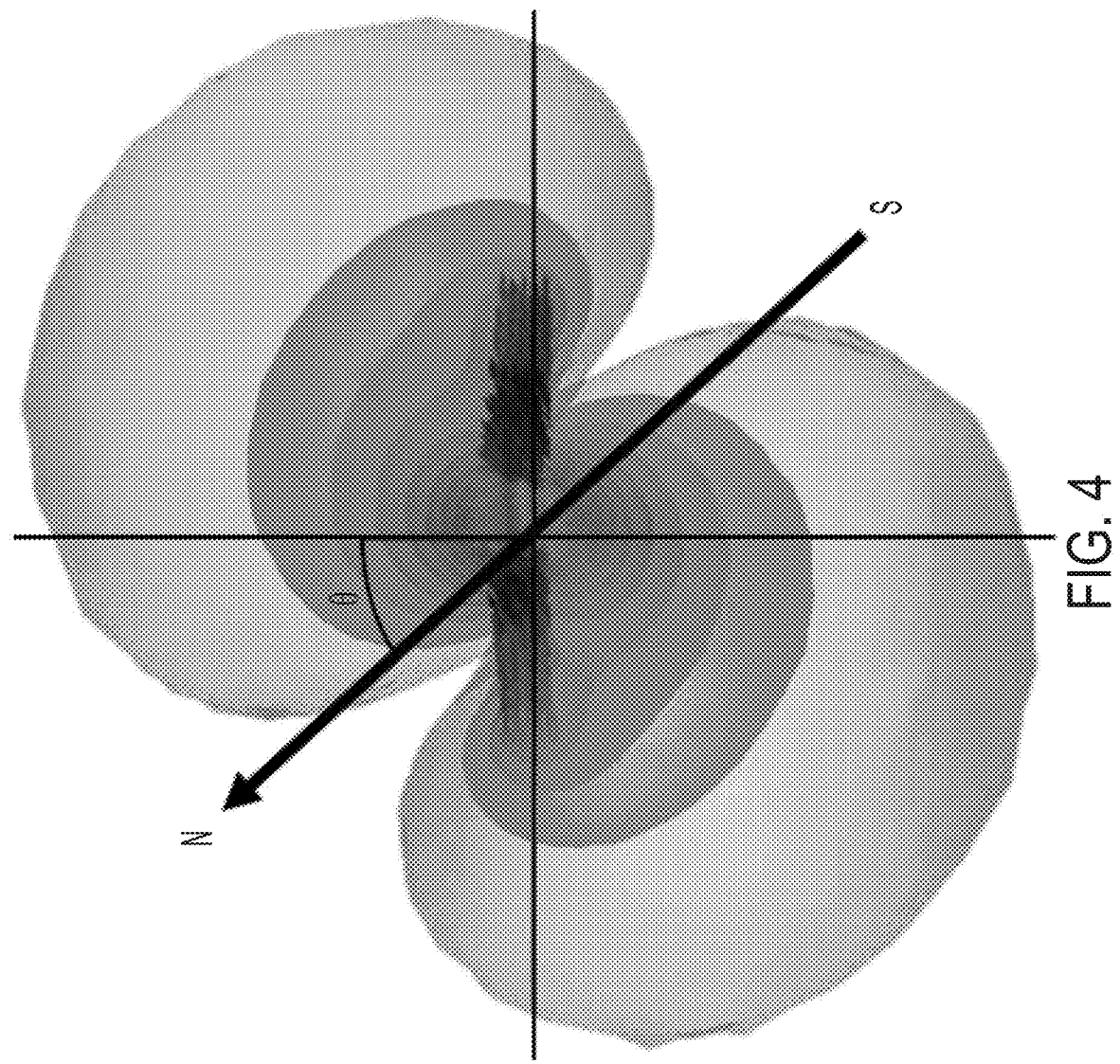
FIG. 4 shows an exemplary permanent magnet with a shaped field due to tailored magnetization, with north (N)-south (S) axis orientation having angle θ from normal direction.

The local orientation of magnetization may be directionally tailored, even if unaligned with the easy axis, to shape the magnetic field generated by the permanent-magnet structure. This is depicted in FIG. 4 which shows an exemplary permanent magnet with a shaped field due to tailored magnetization, with north (N)-south (S) axis orientation having angle θ from normal direction.

The permanent-magnet structure of FIG. 3 is a preferred structure due to location-specified magnetization orientation as well as location-specified crystallographic orientation. Location-specified magnetization and crystallographic orientation may also be referred to as optimized, designated, or pre-selected orientations, since the orientations are designed into the structure intentionally, not randomly generated during fabrication.

Location-specified magnetization and crystallographic orientation, within various regions of the structure, may be optimized to account for the anticipated use conditions. For example, designated orientations may be desirable in locations of high susceptibility of demagnetization. These regions arise when demagnetizing field concentration is high or when orientations with respect to the field direction change rapidly, such as at corners.

An important example is the problem of demagnetization in electric motors. The magnetization of permanent magnets is typically parallel to the long surface. The applied magnetic flux density which magnets experience in electric motor applications is higher at the corners. Thus, the corners demagnetize easier, limiting performance. Also, at magnet corners, edges, or surfaces, there can be severe local heating that raises the local temperature above the Curie temperature of the magnetic material. Normally this would mean that the material loses its persistent magnetic field.

Conventionally, these problems are mitigated by shaping the magnetic field of the permanent magnets in an electric motor via arranging many smaller magnets into a larger Halbach array and adhesively bonding the smaller magnets together.

By contrast, demagnetization can be prevented or at least inhibited at corners, edges, or surfaces by tailoring the crystallographic texture (easy axis alignment). Also, the local composition at the corners, edges, or surfaces that experience local heating may be optimized using a different composition compared to the bulk region. For example, rare earth elements may be included, or at a higher concentration, at corners, edges, or surfaces, or other additional regions compared to the bulk region.

Optimal easy axis orientations with respect to the external field preferably increase the energetic barrier to the nucleation of a reverse magnetic domain. Such optimization preserves magnetization in higher applied fields. In magnetocrystalline anisotropic materials, there may exist more than one easy axis dependent on crystal structure which describes the magneto-crystalline anisotropy. In the case of multiple easy axes, the texture configuration may be chosen in any of the equivalent directions, which may assist in texture control.

The magnetization and crystallographic orientations may or may not be co-aligned in the magnet, even when both of these orientations are controlled. In some preferred embodiments, the magnetic orientation and crystallographic orientation are co-aligned. The magnetization and crystallographic orientations do not need to be co-aligned in the magnet to realize improved demagnetization benefits. In some embodiments, the magnetization and crystallographic orientations are controlled to achieve an average alignment angle between them.

Figure 5:
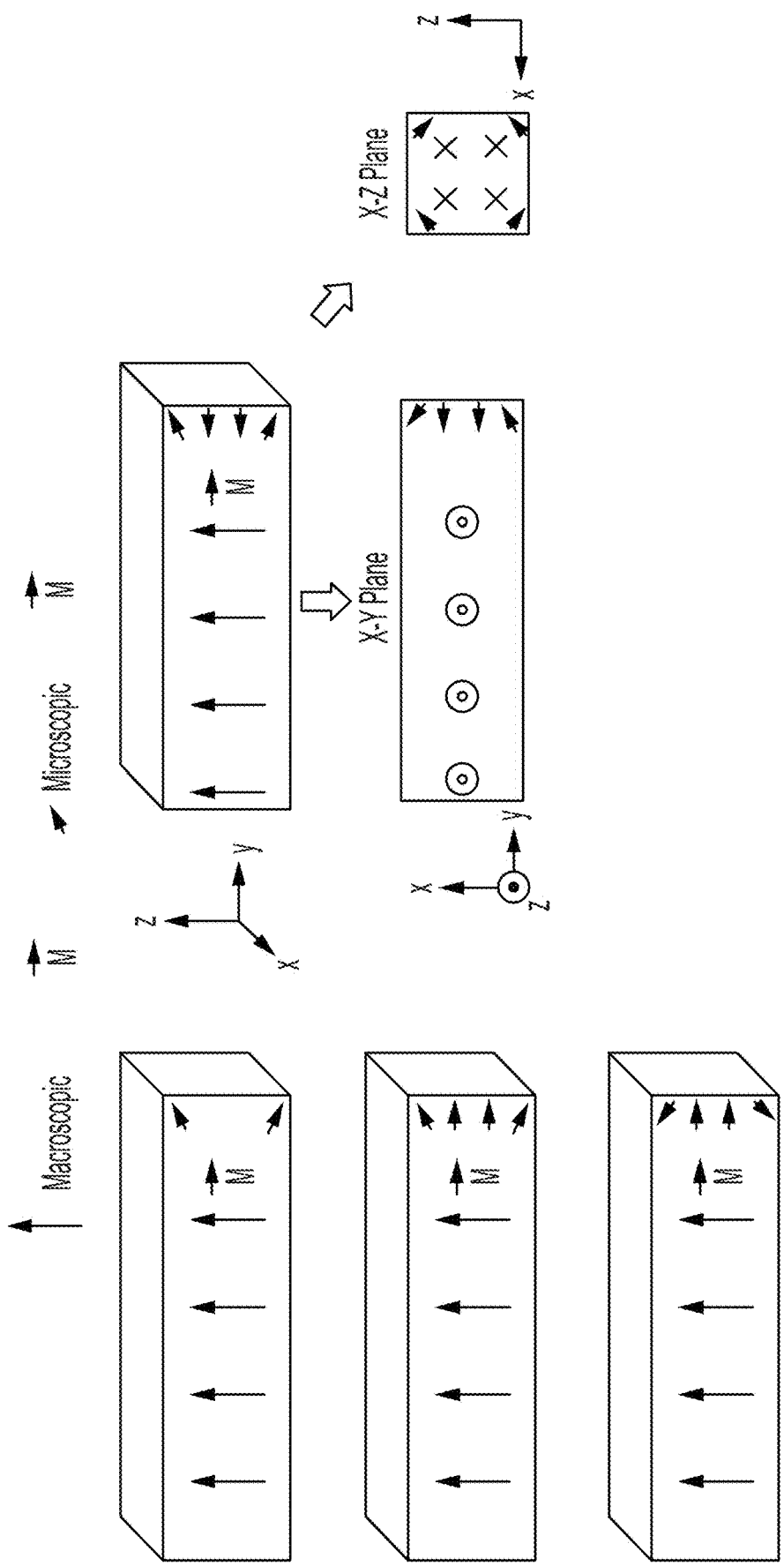
FIG. 5 depicts several examples of magnetic configurations for different orientations that may be employed in various embodiments.

FIG. 5 depicts several examples of magnetic configurations for different orientations that may be employed. The macroscopic and microscopic magnetic fields ($\vec{M}$) are only meant to distinguish tailored orientations at specific regions (corners and edges) compared to the bulk region of each structure, without implying a necessary length scale. Note also that while the arrows in FIG. 5 depict magnetic orientations, similar structures may be drawn in which the arrows denote crystallographic orientations, or multiple sets of arrows denoting magnetic orientations along with crystallographic orientations (such as in FIG. 3).

The torque generated in two dimensions varies with (sin θ)² where the maximum torque, and resistance to demagnetization, is generated perpendicular to the opposing magnetic field. The torque generated in three dimensions, and the 3D resistance to demagnetization as a function of position, may be modeled by one skilled in the art. 3D modeling may be used to aid in pre-selecting regions of interest for tailoring the crystallographic texture. For example, COMSOL Multiphysics® simulation software may be utilized to computationally model and design a permanent-magnet structure.

The permanent-magnet structure is characterized by a total energy product that is the maximum of the magnetic remanence times magnetic coercivity for the structure. The permanent-magnet structure may have a total energy product of greater than 50 kJ/m³, such as about, or at least about, 100 kJ/m³, 200 kJ/m³, 300 kJ/m³, 400 kJ/m³, or 500 kJ/m³, including all intervening ranges. It is known to be difficult to attain high total energy product without using rare-earth metals. Although some embodiments herein incorporate rare-earth metals at least within certain regions of the structure, other embodiment incorporate no rare-earth metals at all (except for impurities). In certain embodiments employing additive manufacturing to control local solidification, the permanent-magnet structure may have a total energy product of greater than 50 kJ/m³, such as about, or at least about, 75 kJ/m³, 100 kJ/m³, 125 kJ/m³, 150 kJ/m³, 175 kJ/m³, or 200 kJ/m³, including all intervening ranges. Tuned anisotropy may be utilized to get the same as, or close to, rare-earth magnetic performance even if rare-earth metals are not incorporated at all or only at critical locations, such as corners.

The design of magnetic orientation and crystallographic orientation enables optimization of magnet properties in non-uniform demagnetizing fields present in nearly every application. In an opposing demagnetizing field, magnetic orientations near the edges or surfaces of permanent-magnet structures become unaligned or at least become sub-optimal in their orientations. By selectively manipulating the local orientation in these regions of rapidly demagnetizing field orientation, to instead resist demagnetization, the ceiling for operating conditions (e.g., temperature and field strength) can be raised. Performance can be improved for demanding motor applications, especially electric vehicle propulsion.

Figure 6:
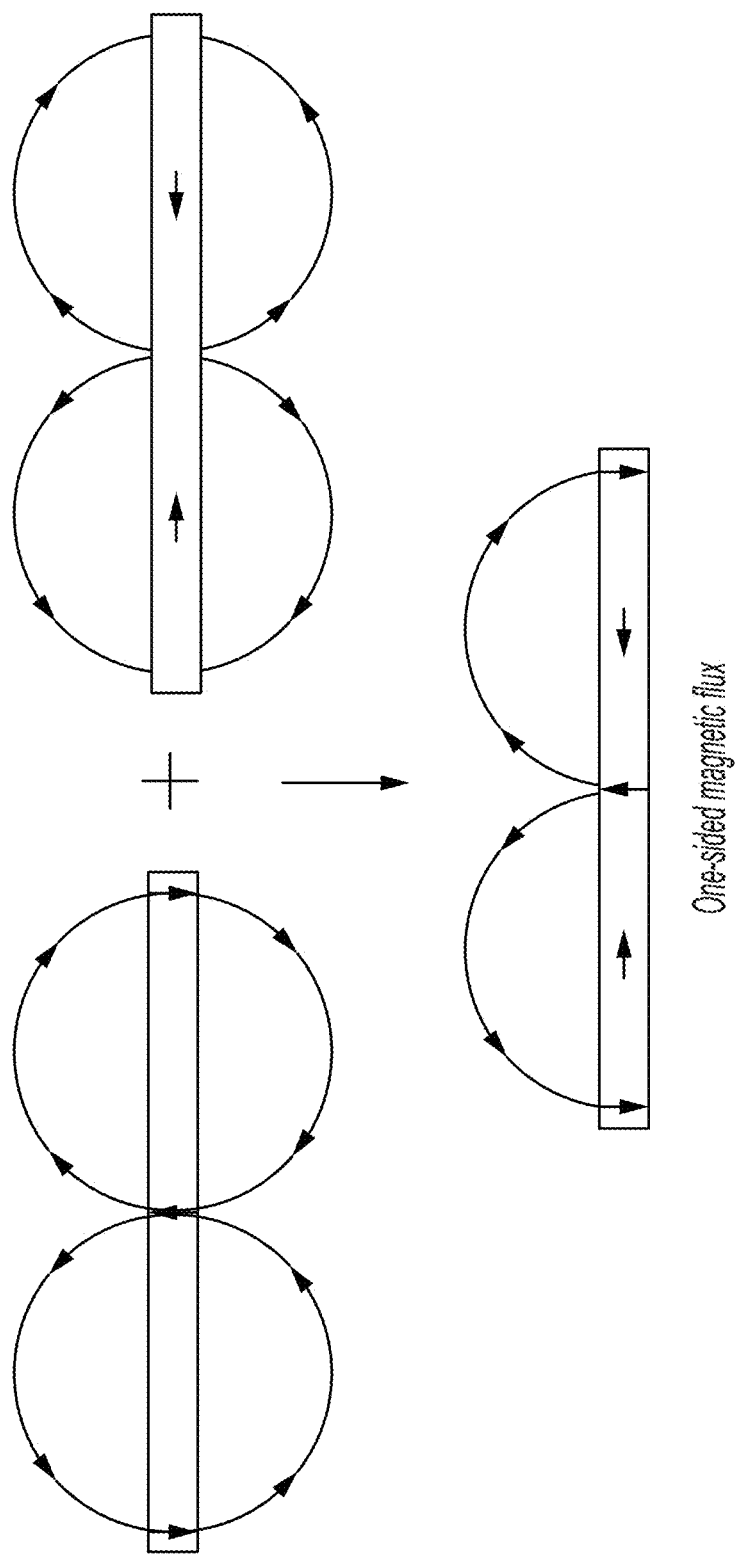
FIG. 6 depicts a Halbach array configured to cause cancellation of magnetic components, resulting in a one-sided magnetic flux.

In some embodiments, magnetic domains are oriented to augment fields on one side of a structure, such as (but not limited to) a Halbach array. A Halbach array may be configured to cause cancellation of magnetic components, resulting in a one-sided magnetic flux, as depicted in FIG. 6. A Halbach array is an arrangement of permanent magnets that augments the magnetic field on one side of the array while cancelling the field to zero or near zero on the other side. An advantage of a one-sided flux distribution is that the field is twice as large on the side on which the flux is confined. Another advantage is the absence of a stray field on the opposite side, which helps with field confinement. Halbach arrays may be used for brushless direct-current motors, free-electron lasers, and wiggler magnets for particle accelerators.

Some preferred variations of the invention will now be further described in reference to additive manufacturing. It will be understood that the invention is not limited to additive manufacturing, but additive manufacturing is especially able to take advantage of many principles taught herein.

Additive manufacturing provides control of crystallographic orientation during 3D printing. The resultant crystallographic orientation of a grain is dependent on several contributing thermodynamic driving forces. One such factor is the direction of the maximum thermal gradient, in which solidifying cubic crystals tend to preferentially grow with a <100> orientation. The thermal gradient can be controlled using a laser scan strategy by locally heating with a variety of spatially and/or temporally varying patterns. The formation of crystallographic texture can also be tailored during solidification and subsequent solid-state transformations through the application of an external magnetic field, potentially producing more texture uniformity with specified locality and direction. Tailorable magnetization may be achieved by varying local magnetic coercivity when using laser or electron beam heat treatment.

In some embodiments, the magnetic performance is improved by controlling crystallographic orientation (texture) of the grains in addition to the magnetization orientation in the microstructure. This control is especially powerful when crystallographic texture and magnetic orientation are both tailored in a synergistic way during additive manufacturing. To this end, the grains may be crystallographically oriented in the (or a) direction that allows the highest remanent magnetization; simultaneously, a magnetic field may be applied to orient the magnetization in that same direction. The result is a magnet with optimal crystallographic and magnetic orientation and therefore the maximum energy product. Magnetic materials may also be optimized by 3D tailoring of crystallographic texture in regions susceptible to demagnetization. By employing additive manufacturing, local thermal, magnetic, and stress fields may be manipulated in the production of permanent magnets having selected crystallographic texture(s) with location specificity.

In some embodiments, without limitation, an additive-manufacturing feedstock is a powder that is surface-functionalized with a plurality of nanoparticles. The nanoparticles may promote heterogeneous nucleation in the melt pool to induce equiaxed grain growth. In some embodiments, the nanoparticles are magnetic nanoparticles.

Some variations provide a method of making a permanent magnet with tailored magnetism, the method comprising:

(a) providing a feedstock composition containing one or more magnetic or magnetically susceptible materials;

(b) exposing a first amount of the feedstock composition to an energy source for melting in a scan direction, thereby generating a first melt layer;

(c) solidifying the first melt layer in the presence of an externally applied magnetic field, thereby generating a magnetic metal layer containing a plurality of individual voxels;

(d) optionally repeating steps (b) and (c) a plurality of times to generate a plurality of solid layers by sequentially solidifying a plurality of melt layers in a build direction, thereby generating a plurality of magnetic metal layers; and (e) recovering a permanent magnet comprising the magnetic metal layer, wherein the externally applied magnetic field has a magnetic-field orientation, defined with respect to the scan direction, that is selected to control (i) a magnetic axis within the magnetic metal layer and/or (ii) a crystallographic texture within the magnetic metal layer.

In some embodiments, the magnetic-field orientation is selected to control the crystallographic texture but not necessarily the magnetic axis within the magnetic metal layer. In some embodiments, the magnetic-field orientation is selected to control the magnetic axis but not necessarily the crystallographic texture within the magnetic metal layer. In preferred embodiments, the magnetic-field orientation is selected to control both the crystallographic texture as well as the magnetic axis within the magnetic metal layer.

The magnetic or magnetically susceptible material in the feedstock composition may include elemental metals, metal alloys, ceramics, metal matrix composites, or combinations thereof, for example. The feedstock composition may be in the form of a powder, a wire, or a combination thereof, for example.

The magnetic or magnetically susceptible material may be selected from the group consisting of Fe, Co, Ni, Cu, Cr, Mg, Mn, Zn, Sr, Ce, Si, B, C, Ba, Tb, Pr, Sm, Nd, Dy, Gd (gadolinium), and combinations or alloys thereof. Exemplary alloys that are magnetic or magnetically susceptible include, but are not limited to, $Fe_2O_3$, FeSi, FeNi, FeZn, MnZn, NdFeB, NdDyFeB, FeCoCr, FeAlNiCo, AlNiCo, SmCo, $Dy_2O_3$, $SrRuO_3$, and combinations thereof.

In some embodiments, without limitation, an additive-manufacturing feedstock is a powder that is surface-functionalized with a plurality of nanoparticles. The nanoparticles may promote heterogeneous nucleation in the melt pool to induce equiaxed grain growth. In some embodiments, the nanoparticles are magnetic or magnetically susceptible and become magnetically aligned during solidification to produce a crystallographic texture dictated by an external magnetic field. Alternatively, or additionally, the nanoparticles—whether or not they are magnetic or magnetically susceptible—may induce growth of a magnetic phase which could then be magnetically aligned with the magnetic-field direction.

A magnetically susceptible material is a material that will become magnetized in an applied magnetic field. Magnetic susceptibility indicates whether a material is attracted into or repelled out of a magnetic field. Paramagnetic materials align with the applied field and are attracted to regions of greater magnetic field. Diamagnetic materials are anti-aligned and are pushed toward regions of lower magnetic fields. On top of the applied field, the magnetization of the material adds its own magnetic field. The magnetizability of materials arises from the atomic-level magnetic properties of the particles of which they are made, typically being dominated by the magnetic moments of electrons.

The energy source may be a laser beam, an electron beam, or both a laser beam and an electron beam. The energy source preferably imposes a thermal gradient that melts a portion of the feedstock composition in a scan direction, rather than bulk melting the entire feedstock composition. In some embodiments, steps (b) and (c) utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, directed energy deposition, plasma arc-based fabrication, ultrasonic consolidation, electric arc melting, and combinations thereof.

In some embodiments, step (b) is also conducted in the presence of the externally applied magnetic field, along with step (c). Optionally, the magnetic-field orientation may be adjusted during step (b).

Steps (b) and (c) together may be referred to as additive manufacturing or welding. When step (d) is employed to generate a plurality of solid layers by sequentially solidifying a plurality of melt layers in a build direction, then steps (b) and (c) together are typically referred to as additive manufacturing or 3D printing.

When step (d) is conducted, the magnetic-field orientation may be adjusted in the build direction. The magnetic-field orientation may be adjusted at every build layer, or may switch back and forth between two different orientations for successive layers, or may incrementally change angle as the build proceeds, as just a few examples of build strategies.

In some preferred embodiments, the magnetic-field orientation is adjusted during step (c), i.e. during solidification of the first melt layer. For example, after some voxels have been formed in a first melt layer, the magnetic-field orientation may be adjusted, after which more voxels are formed in the first melt layer.

In some embodiments, the magnetic-field orientation is selected to control voxel-specific magnetic axes within the plurality of individual voxels contained within the magnetic metal layer. In these or other embodiments, the magnetic-field orientation is selected to control voxel-specific crystallographic textures within the plurality of individual voxels contained within the magnetic metal layer.

A "voxel" is a volumetric (3D) pixel. A plurality of voxels forms a single layer having a thickness defined by the voxel height. In some embodiments, the individual voxels are defined by a characteristic voxel length scale selected from about 50 microns to about 1000 microns. In certain embodiments, the characteristic voxel length scale is selected from about 100 microns to about 500 microns. An exemplary voxel is on the order of 100 μm×100 μm×100 μm. Another exemplary voxel is on the order of 10 μm×10 μm×10 μm.

A voxel may be cubic in geometry, but that is not necessary. For example, a voxel may be rectangular or may have an irregular shape. For an arbitrary voxel geometry, there is a characteristic voxel length scale that is equivalent to the cube root of the average voxel volume. The characteristic voxel length scale may be about, at least about, or at most about 1, 2, 3, 4, 5, 6, 7, 8, 9, 10, 15, 20, 25, 30, 40, 50, 75, 100, 125, 150, 200, 250, 300, 350, 400, 450, 500, 600, 700, 800, 900, or 1000 microns, including all intervening ranges (e.g., 100-500 microns). The characteristic voxel length scale is typically a function of the laser or electron beam intensity, beam diameter, scan speed, and properties (e.g., kinematic viscosity) of the material being fabricated.

In preferred embodiments utilizing additive manufacturing, there is solidification of individual voxels and the magnetic field may be varied voxel-by-voxel, if desired. Using a highly localized energy source, and potentially using different compositions during fabrication, small voxels of a structure can be created with specific crystal orientations and magnetic properties, independently of other voxels.

Depending on the intensity of the energy delivered, each voxel may be created by melting and solidification of a starting feedstock or by sintering or other heat treatment of a region of material, for example. During solidification, a molten form of a voxel produces one or more solid grains with individual crystal structures. In some embodiments, solidified voxels contain single grains. In other embodiments, solidified voxels contain a plurality of grains having some distribution of crystallographic orientations and magnetic orientations. Geometrically, an individual voxel may be the same size as an individual grain, or may be larger than an average grain size within a magnetic metal layer. In various embodiments, an average voxel contains about, at least about, or at most about 1, 1.5, 2, 2.5, 3, 4, 5, 6, 7, 8, 9, 10, 15, 20, 25, 50, 75, or 100 grains, including all intervening ranges.

When a voxel contains a plurality of grains each having its own crystallographic orientation and magnetic easy axis, the voxel will have a voxel-average crystallographic orientation and a voxel-average magnetic easy axis. In some embodiments, a voxel is configured such that all grains have the same or similar crystallographic orientations and/or magnetic easy axes. In other embodiments, a voxel is configured such that individual grains have different crystallographic orientations and/or magnetic easy axes.

A magnetic metal layer from additive manufacturing or welding has crystallographic texture arising from individual grains which, in turn, form voxels. There is a magnetic easy axis for each grain, an average magnetic easy axis for each voxel, and an average magnetic easy axis for the magnetic metal layer. Using the principles of this disclosure, there may be varying degrees of alignment between these hierarchical magnetic easy axes.

In certain embodiments, a voxel contains a plurality of grains with a narrow crystallographic orientation distribution along the easy axis of the crystal as well as co-aligned magnetic domains contained within each grain. This co-alignment produces the maximum total remanent magnetic flux for the voxel. In a larger structure with a plurality of voxels, there may be a narrow crystallographic orientation distribution along the easy axis as well as co-aligned magnetic domains contained within each voxel. This co-alignment produces the maximum total remanent magnetic flux for the structure.

The grain sizes may vary widely, such as from about 0.1 microns to about 1000 microns. In various embodiments, the average grain size (within a given voxel or within the overall structure) may be about, at least about, or at most about 0.1, 0.2, 0.3, 0.4, 0.5, 0.6, 0.7, 0.8, 0.9, 1, 1.5, 2, 3, 4, 5, 6, 7, 8, 9, 10, 15, 20, 25, 30, 35, 40, 45, 50, 75, 100, 125, 150, 200, 250, 300, 350, 400, 500, 600, 700, 800, 900, or 1000 microns.

When step (d) is conducted, to generate a plurality of solid layers by sequentially solidifying a plurality of melt layers in a build direction, the magnetic-field orientation may be adjusted in the build direction. In other words, the magnetic-field orientation may be different for one layer versus another layer, in addition to variations of the magnetic-field orientation within a layer (voxel-specific magnetic-field orientations).

The atomic structure of a crystal introduces preferential directions for magnetization. This is referred to as magnetocrystalline anisotropy. A "magnetic easy axis" is a direction inside a crystal, along which a small applied magnetic field is sufficient to reach the saturation magnetization. There can be a single easy axis or multiple easy axes. A "magnetic hard axis" is a direction inside a crystal, along which a large applied magnetic field is needed to reach the saturation magnetization. There will be a magnetic easy axis and a magnetic hard axis whether or not a magnetic field is actually being applied. The magnetic easy axis is different from the magnetic axis. A magnetic axis is only present when a magnetic field is actually applied, whereas a magnetic easy axis is a fixed property of a given crystalline material.

In some embodiments of the invention, the magnetic-field orientation may be selected to control voxel-specific magnetic easy axes within the plurality of individual voxels contained within the magnetic metal layer.

In some embodiments, the individual voxels are substantially magnetically aligned with each other, in reference to the magnetic easy axes of each voxel within a given magnetic metal layer. By "substantially magnetically aligned" is it meant that there is a standard deviation that is less than 25°, less than 20°, less than 10°, or less than 5°, calculated based on all of the magnetic easy axes within the magnetic metal layer. In certain embodiments, all magnetic easy axes are substantially aligned, such that the standard deviation is less than 2°, less than 1°, less than 0.5°, less than 0.1°, or about 0°. Remanence measurements may be used to determine the alignment of magnetic easy axes. See McCurrie, "Determination of the degree of easy axis alignment in uniaxial permanent magnets from remanence measurements" *Journal of Applied Physics* 52, 7344 (1981), which is hereby incorporated by reference.

In some preferred embodiments, the magnetic-field orientation is selected to control voxel-specific magnetic axes as well as voxel-specific magnetic easy axes within the plurality of individual voxels contained within the magnetic metal layer, wherein the voxel-specific magnetic axes are substantially aligned with the voxel-specific magnetic easy axes for at least a portion of the magnetic metal layer. In certain embodiments, the voxel-specific magnetic axes are substantially aligned with the voxel-specific magnetic easy axes for all of the magnetic metal layer.

In other embodiments, the magnetic-field orientation is selected to control voxel-specific magnetic axes as well as voxel-specific magnetic easy axes within the plurality of individual voxels contained within the magnetic metal layer, wherein the voxel-specific magnetic axes are configured to be at angles with the voxel-specific magnetic easy axes for at least a portion of the magnetic metal layer.

In some methods, conditions in step (b) and/or step (c) are controlled such that thermal gradients assist in generating the crystallographic texture within the magnetic metal layer.

In some embodiments, different feedstock compositions, each comprising one or more magnetic or magnetically susceptible materials, are exposed to the energy source. The crystallographic texture may be adjusted during the method by performing step (b), step (c), and optionally step (d) at different times using different feedstock compositions. Different feedstock compositions may be not only different species, but also different concentrations of the same species.

Optionally, different feedstock compositions, each comprising one or more magnetic or magnetically susceptible surface-modifying particles, are exposed to the energy source, and the crystallographic texture is adjusted during the method by performing step (b), step (c), and optionally step (d) at different times using the different feedstock compositions.

In certain embodiments, neither the base particles nor the surface-modifying particles are magnetic or magnetically susceptible, but during fabrication, grains are produced which are magnetic or magnetically susceptible. An externally applied magnetic field may align those grains during solidification.

Different feedstock compositions also enable the fabrication of graded compositions. For instance, the concentration of magnetic rare earth elements may be adjusted throughout a magnetic structure. One example employs local doping of Dy, Nd, or Yb in areas that are susceptible to demagnetization. Local doping may be achieved via spray additive processes, for example.

Some embodiments optimize the crystallographic texture site-specifically throughout the volume of the magnet. In contrast to conventionally processed magnetic materials with a single easy axis orientation, or a narrow distribution of easy axis orientations, texture-controlled permanent magnets disclosed herein may possess easy axis orientations tailored to resist demagnetizing fields in regions of high susceptibility of demagnetization. Such regions may exist where demagnetizing field concentration is high and/or where orientations with respect to the magnetic field direction change rapidly, such as at corners.

Interfaces between domains are susceptible to domain reversal (demagnetization) due to a relatively low barrier to nucleation. Optimal easy axis orientations with respect to the external magnetic field preferably increase the energy barrier to nucleation of a reverse magnetic domain, thereby preserving magnetization. For example, by matching a single magnetic domain with a single grain, the resistance to domain reversal within that grain is minimized, raising the energy barrier to nucleation of a reverse domain.

In general, the geometry of the feedstock composition is not limited and may be, for example, in the form of powder particles, wires, rods, bars, plates, films, coils, spheres, cubes, prisms, cones, irregular shapes, or combinations thereof. In certain embodiments, the feedstock composition is in the form of a powder, a wire, or a combination thereof (e.g., a wire with powder on the surface). When the feedstock composition is in the form of powder, the powder particles may have an average diameter from about 1 micron to about 500 microns, such as about 10 microns to about 100 microns, for example. When the feedstock composition is in the form of a wire, the wire may have an average diameter from about 10 microns to about 1000 microns, such as about 50 microns to about 500 microns, for example.

The energy source for additive manufacturing may be provided by a laser beam, an electron beam, alternating current, direct current, plasma energy, induction heating from an applied magnetic field, ultrasonic energy, other sources, or a combination thereof. Typically, the energy source is a laser beam or an electron beam.

Process steps (b) and (c) may utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof, for example.

In certain embodiments, the additive manufacturing process is selected from the group consisting of selective laser melting, energy-beam melting, laser engineered net shaping, and combinations thereof.

Selective laser melting utilizes a laser (e.g., Yb-fiber laser) to provide energy for melting. Selective laser melting is designed to use a high power-density laser to melt and fuse metallic powders together. The process has the ability to fully melt the metal material into a solid 3D part. A combination of direct drive motors and mirrors, rather than fixed optical lens, may be employed. An inert atmosphere is usually employed. A vacuum chamber can be fully purged between build cycles, allowing for lower oxygen concentrations and reduced gas leakage. Selective laser melting is a type of powder bed-based additive manufacturing.

Electron beam melting uses a heated powder bed of metal that is then melted and formed layer by layer, in a vacuum, using an electron beam energy source similar to that of an electron microscope. Metal powder is welded together, layer by layer, under vacuum. Electron beam melting is another type of powder bed-based additive manufacturing.

Laser engineering net shaping is a powder-injected technique operates by injecting metal powder into a molten pool of metal using a laser as the energy source. Laser engineered net shaping is useful for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication.

Direct metal laser sintering process works by melting fine powders of metal in a powder bed, layer by layer. A laser supplies the necessary energy and the system operates in a protective atmosphere, typically of nitrogen or argon.

Another approach utilizes powder injection to provide the material to be deposited. Instead of a bed of powder that is reacted with an energy beam, powder is injected through a nozzle that is then melted to deposit material. The powder may be injected through an inert carrier gas or by gravity feed. A separate shielding gas may be used to protect the molten metal pool from oxidation.

Directed energy deposition utilizes focused energy (either an electron beam or laser beam) to fuse materials by melting as the material is being deposited. Powder or wire feedstock can be utilized with this process. Powder-fed systems, such as laser metal deposition and laser engineered net shaping, blow powder through a nozzle, with the powder melted by a laser beam on the surface of the part. Laser-based wirefeed systems, such as laser metal deposition-wire, feed wire through a nozzle with the wire melted by a laser, with inert gas shielding in either an open environment (gas surrounding the laser), or in a sealed gas enclosure or chamber.

Powder bed-based additive manufacturing is preferred for its ability to produce near-net-shape products as well as the smaller tailorable voxel size (such as about 200 μm or less) compared to directed energy deposition (conventionally >500 μm).

Some embodiments utilize wire feedstock and an electron beam heat source to produce a near-net shape part inside a vacuum chamber. An electron beam gun deposits metal via the wire feedstock, layer by layer, until the part reaches the desired shape. Then the part optionally undergoes finish heat treatment and machining. Wire can be preferred over powder for safety and cost reasons.

Additive manufacturing provides the opportunity to tailor local structure voxel-by-voxel in a serial, layered process. A processed voxel is the volume affected by heat input from the direct energy source in a layer-based approach, which volume includes the melt pool as well as the surrounding heat-affected zone. The solidification crystallographic texture may be controlled by the direction of heat extraction. In addition to the thermal field, a magnetic field may be applied during processing to control both crystallographic texture and magnetization orientation. The external magnetic field may be generated by means of an induction coil, multiple induction coils, a permanent magnet, or an array of permanent magnets, for example.

In some embodiments, the additively manufactured permanent magnet has a microstructure with a crystallographic texture that is not solely oriented in the additive-manufacturing build direction. For example, the solid layers may have differing primary growth-direction angles with respect to each other.

The method is not limited in principle to the number of solid layers that may be fabricated. A "plurality of solid layers" in step (d) means at least 2 layers, such as at least 10 individual solid layers. The number of solid layers may be much greater than 10, such as about 100, 1000, or more. As noted earlier, in the case of welding or single-layer manufacturing, there may be a single layer in the final structure. Multiple-layer welding is another embodiment.

The plurality of solid layers may be characterized by an average layer thickness of at least 10 microns, such as about 10, 20, 30, 40, 50, 75, 100, 150, or 200 microns, for example.

Each solid layer may contain a number of voxels. In a special case for a substantially vertical build (e.g., a narrow column), there may be a single voxel per layer. The average number of voxels per layer may be about, at least about, or at most about 2, 3, 4, 5, 10, 20, 30, 40, 50, 100, 150, 200, 300, 400, 500, 600, 700, 800, 900, or 1000, including all intervening ranges, for example.

One or more solid layers may have a microstructure with equiaxed grains. A microstructure that has "equiaxed grains" means that at least 90 vol %, preferably at least 95 vol %, and more preferably at least 99 vol % of the metal alloy contains grains that are roughly equal in length, width, and height. In some embodiments, at least 99 vol % of the magnet contains grains that are characterized in that there is less than 25%, preferably less than 10%, and more preferably less than 5% standard deviation in each of average grain length, average grain width, and average grain height. Equiaxed grains may result when there are many nucleation sites arising from grain-refining nanoparticles contained in the microstructure.

The surface-modifying particles of some embodiments are grain-refining nanoparticles. The grain-refining nanoparticles are preferably present in a concentration of at least 0.01 vol %, such as at least 0.1 vol %, at least 1 vol %, or at least 5 vol % of the feedstock composition. In various embodiments, the grain-refining nanoparticles are present in a concentration of about, or at least about, 0.1, 0.2, 0.5, 1, 2, 3, 4, 5, 6, 7, 8, 9, or 10 vol %.

In some embodiments, the grain-refining nanoparticles are lattice-matched to within ±5% compared to an otherwise-equivalent material containing the base particles but not the grain-refining nanoparticles. In certain embodiments, the grain-refining nanoparticles are lattice-matched to within ±2% or within ±0.5% compared to a material containing the base particles but not the grain-refining nanoparticles.

Preferably, the microstructure of the additively manufactured magnet is substantially crack-free. The avoidance of cracks can be important for magnets. For example, samarium-cobalt magnets are brittle and prone to cracking and chipping. Crack-free SmCo-based permanent magnets may be fabricated.

A magnet microstructure that is "substantially crack-free" means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. The non-desirable material disposed within the crack may itself contain a higher porosity than the bulk material, may contain a different crystalline (or amorphous) phase of solid, or may be a different material altogether, arising from impurities during fabrication, for example.

The magnet microstructure may be substantially free of porous defects, in addition to being substantially crack-free. "Substantially free of porous defects" means at least 99 vol % of the magnet contains no porous voids having an effective diameter of at least 1 micron.

Preferably, at least 80 vol %, more preferably at least 90 vol %, even more preferably at least 95 vol %, and most preferably at least 99 vol % of the magnet contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, and optionally to arrive at a final additively manufactured magnet that is substantially free of porous defects in addition to being substantially crack-free.

In additive manufacturing, post-production processes such as heat treatment, light machining, surface finishing, coloring, stamping, or other finishing operations may be applied. Also, several additive manufactured parts may be joined together chemically or physically to produce a final magnet.

EXAMPLE

This example demonstrates crystallographic texture control of a laser-welded $Nd_2Fe_{14}B$ magnet structure.

A $Nd_2Fe_{14}B$ magnet structure is processed in a laser-welding machine with an external magnetic field. A DC magnetic field with flux density of approximately 1 T is applied parallel to the horizontal face of a sintered $Nd_2Fe_{14}B$ magnet structure. Single-track weld lines are generated using a pulsed infrared laser-welder moving the surface through the static DC field.

Figure 7:
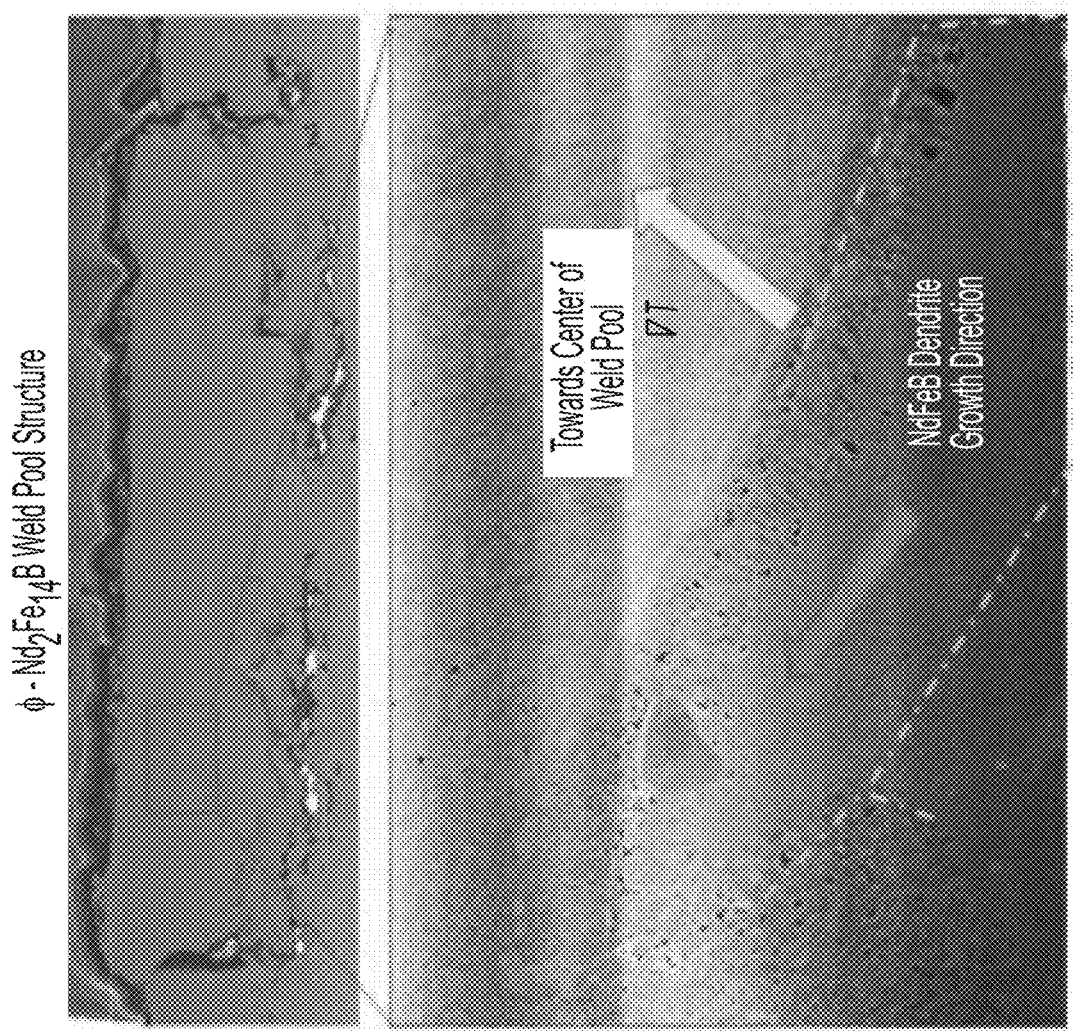
FIG. 7 shows photomicrographs of the $Nd_2Fe_{14}B$ magnet microstructure with a shifted dendrite growth direction against the direction of maximum thermal gradient, in the Example.
Figure 8:
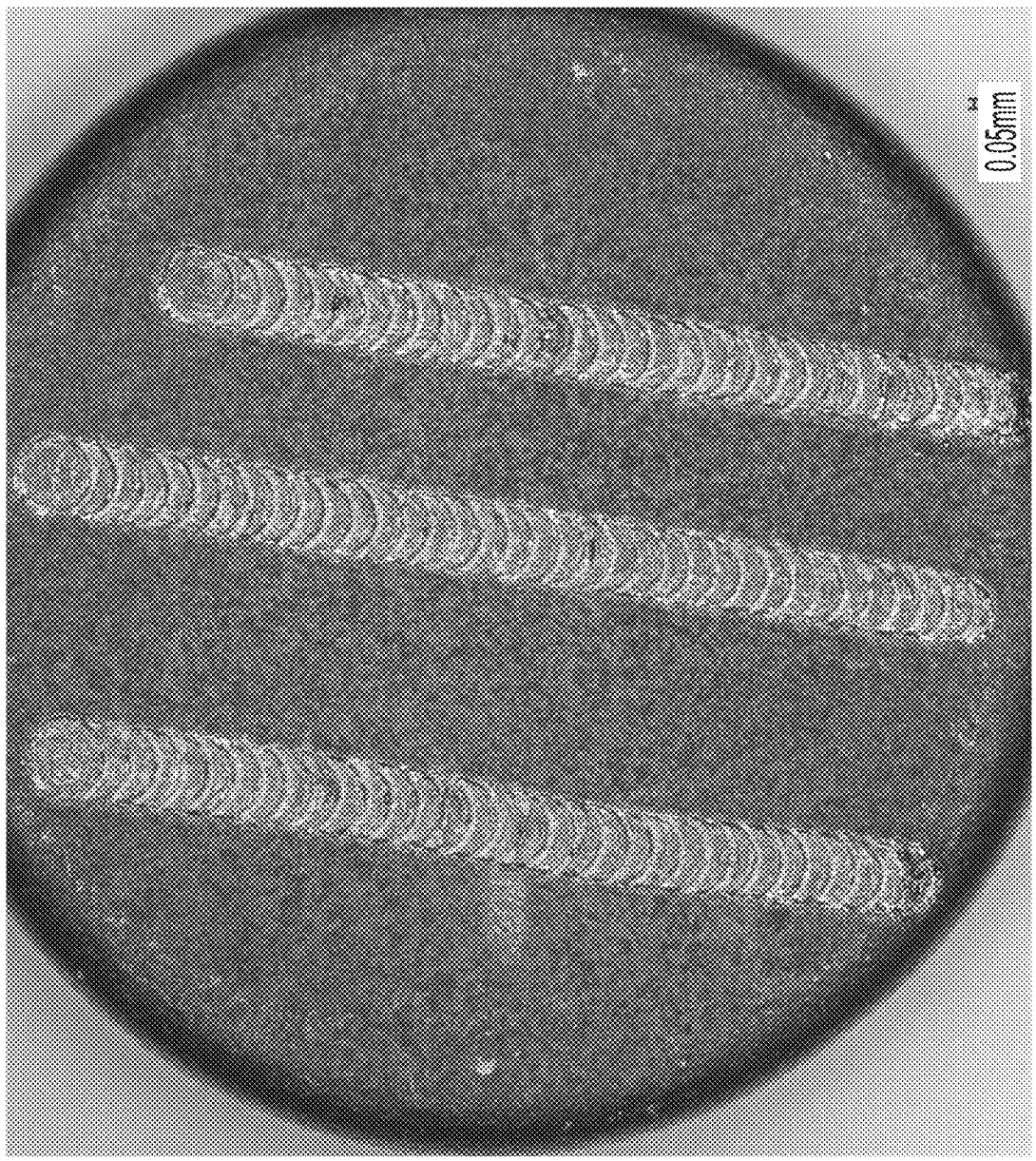
FIG. 8 shows a photomicrograph top view of the laser-welded $Nd_2Fe_{14}B$ magnet structure, in the Example.
Figure 9:
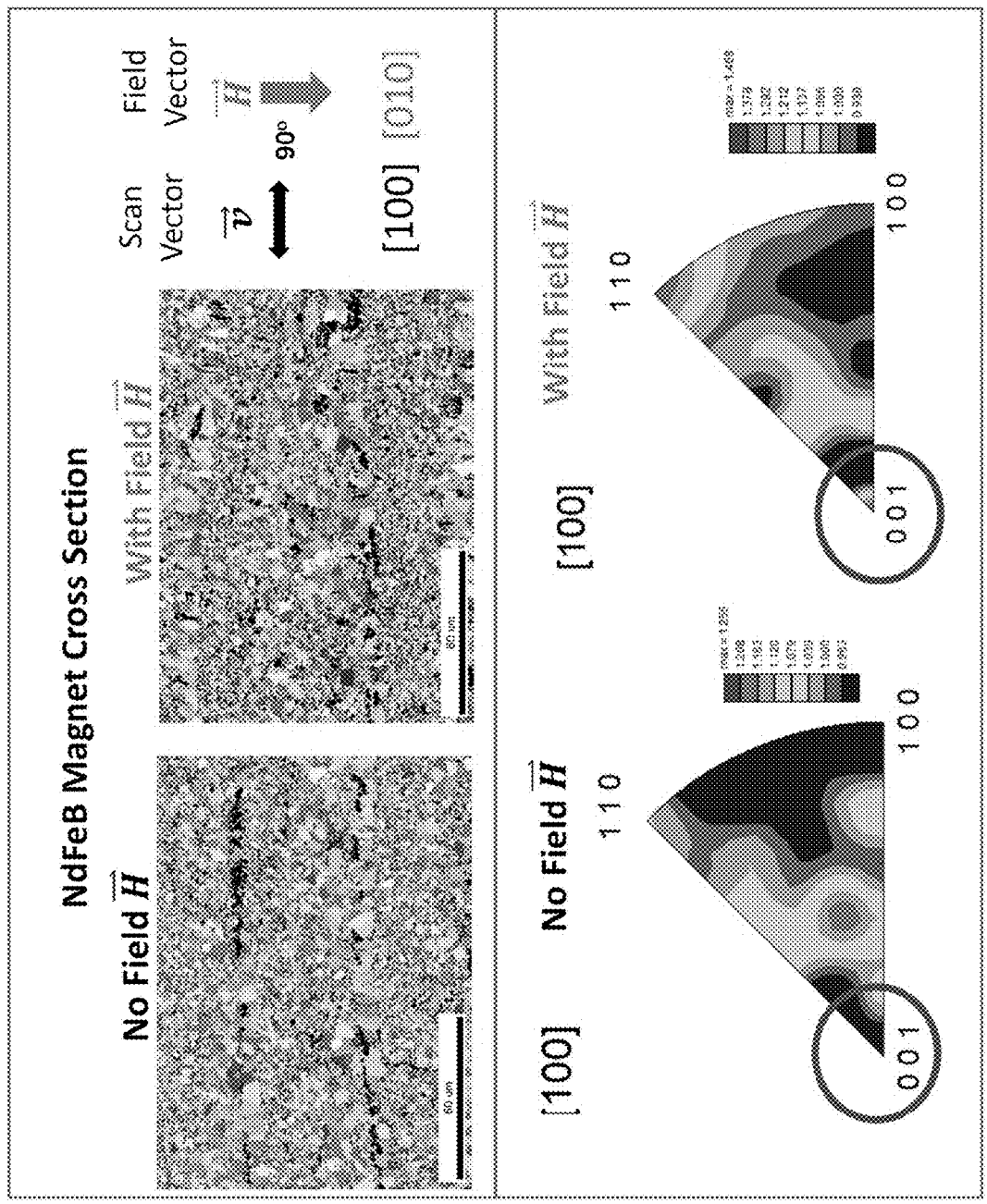
FIG. 9 shows the increase in NdFeB easy axis [001] texture along the scan vector direction in IPF density plots, in the Example. EBSD maps are provided for reference orientations.

FIG. 7 shows photomicrographs of the $Nd_2Fe_{14}B$ magnet microstructure with a shifted dendrite growth direction against the direction of maximum thermal gradient. FIG. 8 shows a photomicrograph top view of the laser-welded $Nd_2Fe_{14}B$ magnet structure. FIG. 9 shows the increase in NdFeB easy axis [001] texture along the scan vector direction in IPF (inverse pole figure) density plots. EBSD (electron backscatter diffraction) maps are provided for reference orientations. The IPF density plots are shown in the lower half of FIG. 9, and the EBSD maps are shown in the upper half of FIG. 9.

Epitaxial dendritic solidification tends to grow in the direction of the largest thermal gradient. However, under an external magnetic field, the solidification direction is unaligned with the maximum thermal gradient. Adjustment of the field direction influences texture evolution (from the dendritic solidification direction) with greater or less magnitude in accordance with the magnitude and field applied.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A permanent-magnet structure comprising:
a region having a plurality of magnetic domains and a region-average magnetic axis, wherein each of said magnetic domains has a domain magnetic axis, wherein each said domain magnetic axis is substantially aligned with said region-average magnetic axis, and wherein said plurality of magnetic domains is characterized by an average magnetic domain size from 1 micron to 1000 microns; and
within said region, a plurality of metal-containing grains, wherein said plurality of metal-containing grains is characterized by an average grain size from 0.1 microns to 50 microns,
wherein said metal-containing grains contain a metal alloy selected from the group consisting of NdFeB, NdDyFeB, FeCoCr, FeAlNiCo, SmCo, $Dy_2O_3$, $SrRuO_3$, $Fe_2O_3$, FeSi, FeNi, FeZn, MnZn, and combinations thereof,
wherein each of said magnetic domains has a domain easy axis that is dictated by a crystallographic texture of said metal-containing grains;
wherein said region has a region-average easy axis based on average value of said domain easy axis within said region; and
wherein said region-average magnetic axis and said region-average easy axis form a region-average alignment angle θ, wherein said region-average alignment angle θ is from −10° to 10°, and wherein said region-average alignment angle θ has a 0 standard deviation of less than 10° based on alignment-angle variance within said plurality of magnetic domains.

2. The permanent-magnet structure of claim 1, wherein said metal alloy is NdFeB.

3. The permanent-magnet structure of claim 1, wherein said θ standard deviation is less than 5°.

4. The permanent-magnet structure of claim 1, wherein said region-average alignment angle θ is from −2° to 2°.

5. The permanent-magnet structure of claim 1, wherein said region-average alignment angle θ is 0°.

6. The permanent-magnet structure of claim 1, wherein said region-average easy axis has a standard deviation that is less than 25°.

7. The permanent-magnet structure of claim 1, wherein said region-average easy axis has a standard deviation that is less than 20°.

8. The permanent-magnet structure of claim 1, wherein said region-average easy axis has a standard deviation that is less than 10°.

9. The permanent-magnet structure of claim 1, wherein said region-average easy axis has a standard deviation that is less than 5°.

10. The permanent-magnet structure of claim 1, wherein each said domain easy axis is substantially aligned with said region-average easy axis.

11. The permanent-magnet structure of claim 1, wherein said average magnetic domain size is about the same as said average grain size.

12. The permanent-magnet structure of claim 1, wherein said average magnetic domain size is larger than said average grain size.

13. The permanent-magnet structure of claim 1, wherein said average magnetic domain size is from 1 micron to 1000 microns.

14. The permanent-magnet structure of claim 1, wherein said average magnetic domain size is from 10 microns to 10 millimeters.

15. The permanent-magnet structure of claim 1, wherein said average grain size is from 1 micron to 5 microns.

16. The permanent-magnet structure of claim 1, wherein said metal-containing grains are substantially equiaxed grains.

17. The permanent-magnet structure of claim 1, wherein said metal-containing grains are substantially columnar grains.

18. The permanent-magnet structure of claim 1, wherein said metal-containing grains are a combination of substantially equiaxed grains and substantially columnar grains.

19. The permanent-magnet structure of claim 1, wherein said region has a characteristic length scale selected from 100 microns to 1 meter.

20. The permanent-magnet structure of claim 1, wherein said permanent-magnet structure contains at least one additional region having a plurality of additional magnetic domains and a plurality of metal-containing grains, wherein said additional region has a different composition compared to said region, wherein said additional region contains a metal alloy selected from the group consisting of NdFeB, NdDyFeB, FeCoCr, FeAlNiCo, SmCo, $Dy_2O_3$, $SrRuO_3$, $Fe_2O_3$, FeSi, FeNi, FeZn, MnZn, and combinations thereof, and wherein said additional region further contains a rare earth element selected from Dy, Nd, or Yb.

21. The permanent-magnet structure of claim 1, wherein said permanent-magnet structure is contained within a Halbach array.

22. The permanent-magnet structure of claim 1, wherein said permanent-magnet structure is an additively manufactured structure.

23. The permanent-magnet structure of claim 1, wherein said permanent-magnet structure is a welded structure.

24. The permanent-magnet structure of claim 1, wherein said permanent-magnet structure is contained within a solid bulk magnet.

25. The permanent-magnet structure of claim 1, wherein said permanent-magnet structure is contained within a porous magnet.

26. The permanent-magnet structure of claim 1, wherein said permanent-magnet structure is produced in the presence of a magnetic field during solidification of said metal-containing grains.

27. The permanent-magnet structure of claim 1, wherein said permanent-magnet structure has a crack-free microstructure.

28. The permanent-magnet structure of claim 20, wherein said additional region is contained at a corner or edge of said permanent-magnet structure.

29. The permanent-magnet structure of claim 20, wherein said additional region is contained at a surface of said permanent-magnet structure.

* * * * *